United States Patent [19]
Tavlykaev et al.

[11] Patent Number: 5,917,974
[45] Date of Patent: Jun. 29, 1999

[54] METHOD AND APPARATUS FOR IMPLEMENTING COUPLED GUIDING STRUCTURES WITH APODIZED INTERACTION

[75] Inventors: Robert F. Tavlykaev; Ramu V. Ramaswamy, both of Gainesville, Fla.

[73] Assignee: Advanced Photonics Technology, Inc., Gainesville, Fla.

[21] Appl. No.: 08/904,895

[22] Filed: Aug. 1, 1997

[51] Int. Cl.$^6$ ..................................................... G02B 6/26
[52] U.S. Cl. ................................ 385/50; 385/39; 385/45
[58] Field of Search ........................... 385/50, 16, 39–49; 359/248

[56] References Cited

U.S. PATENT DOCUMENTS

| | | | |
|---|---|---|---|
| 4,950,044 | 8/1990 | Makita | 385/14 X |
| 4,984,861 | 1/1991 | Suchoski, Jr. et al. | 385/45 |
| 5,131,060 | 7/1992 | Sakata | 385/2 |

(List continued on next page.)

OTHER PUBLICATIONS

Aronson, L.B., G. Rankin, W.R. Trutna, Jr., D.W. Dolfi (1993) "Reduced sidelobe integrated acousto–optic filter with birefringence apodization" *Optics Letters* 18(20):1721–1723.

Bornholdt, C., F. Kappe, R. Muller, H.–P. Nolting, F. Reier, R. Stenzel, H. Venghaus, C.M. Weinert (1990) "Meander coupler, a novel wavelength division multiplexer/demultiplexer" *Appl. Phys. Lett* 57(24):2517–2519.

Kar–Roy, Arjun and Chen S. Tsai (1992) "Low–Sidelobe Weighted–Coupled Integrated Acoustooptic Tunable Filter Using Focused Surface Acoustic Waves" *IEEE Photonics Technology Letters* 4(10):1132–1135.

Kar–Roy, Arjun Chen S. Tsai (1994) "Ultralow Sidelobe–Level Integrated Acoustooptic Tunable Filters Using Tapered–Gap Surface Acoustic Wave Directional Couplers" *Journal of Lightwave Technology* 12(6):977–982.

Kim, I., R.C. Alferness, U. Koren, L.L. Buhl, B.I. Miller, M.G. Young, M.D. Chien, T.L. Koch, H.M. Presby, G. Raybon, C.A. Burrus (1994) "Broadly tunable vertical–coupler filtered tensile–strained InGaAs/InGaAsP multiple quantum well laser" *Appl. Phys. Lett* 64(21):2764–2766.

Smith, D.A., J.J. Johnson, B.L. Heffner, K.–W. Cheung, J.E. Baran (1989) "Two–Stage Integrated–Optic Acoustically Tunable Optical Filter With Enhanced Sidelobe Suppression" *Electronics Letters* 25(6):398–399.

Song, Ghie–Hugh, Sang–Yung Shin (1985) "Design of currugated waveguide filters by the Gel'fand–Levitan–Marchenko inverse–scattering method" *Journal of Optical Society of America A* 2(11):1905–1915.

Trutna, Jr., W.R., David W. Dolfi, Curt A. Flory (1993) Anomalous sidelobes and birefringence apodization in acousto–optic tunable filters *Optics Letters* 18(1):28–30.

Song, G. Hugh (1994) "Proposal for acousto–optic tunable filters with near–ideal bandpass characteristics" *Applied Optics* 33(31):7458–7460.

*Primary Examiner*—Phan T. H. Palmer
*Attorney, Agent, or Firm*—Saliwanchik, Lloyd & Saliwanchik

[57] ABSTRACT

The subject invention pertains to a method of apodizing interaction in spatially-coupled waveguides capable of implementing any desired interaction-strength profiles, for example, alternating functions. Wavelength filters with various types of spectral response can be synthesized. In a preferred embodiment, a Butterworth-type interaction profile is disclosed which provides a flat-top response with suppressed sidelobes. The method according to the subject invention is based on spatially offsetting a single-mode waveguide with respect to a two-mode waveguide in which the anti-symmetric mode is excited by using a Y-junction mode splitter. The method can easily be implemented in vertically-coupled structures fabricated with the use of conventional fabrication processes. Various embodiments of the method implemented. The subject invention further pertains to the device produced in accordance with the methods of the subject invention.

30 Claims, 3 Drawing Sheets

U.S. PATENT DOCUMENTS

| | | | |
|---|---|---|---|
| 5,140,149 | 8/1992 | Sakata et al. | 385/50 X |
| 5,193,128 | 3/1993 | Farina et al. | 385/3 |
| 5,218,653 | 6/1993 | Johnson et al. | 385/3 |
| 5,333,216 | 7/1994 | Sakata et al. | 385/11 |
| 5,446,807 | 8/1995 | Baran et al. | 385/11 |
| 5,495,543 | 2/1996 | Alferness et al. | 385/37 |
| 5,563,970 | 10/1996 | Little et al. | 385/42 |
| 5,703,980 | 12/1997 | MacElwee et al. | 385/49 |
| 5,754,714 | 5/1998 | Suzuki et al. | 385/16 X |
| 5,801,872 | 9/1998 | Tsuji | 359/248 |

METHOD AND APPARATUS FOR IMPLEMENTING COUPLED GUIDING STRUCTURES WITH APODIZED INTERACTION

FIELD OF THE INVENTION

The present invention pertains to a method and apparatus for realizing apodized, tunable, integrated-optic filters. This invention is further concerned with a method of implementing filters with a flat-top response and suppressed sidelobes for high-density Wavelength Division Multiplexed (WDM) networks. This invention also relates to any coupled-waveguide structures with apodized interaction.

BACKGROUND OF THE INVENTION

Without limiting the scope of the invention, its background is described in connection with apodizing techniques for wavelength filters in wavelength division multiplexed (WDM) networks.

Wavelength Division Multiplexing offers tremendous opportunities in exploiting the enormous information capacity offered by optical fibers. Of paramount importance for WDM networks is the ability to efficiently route optical carriers of different wavelengths to various channels. In an optically transparent WDM network, this function is performed by a cross-connect of optical channels whose main element is an optical filter. When assessing the quality of a filter to be deployed in such networks, three parameters are of special importance, namely, the bandwidth of the filter, the flatness of the filter response, and the level of sidelobe suppression. Specifically, these parameters determine the minimum channel separation.

A single-stage filter with uniform coupling (the coupling coefficient is independent of the position along the propagation direction) exhibits a sinc-squared response with a first sidelobe level of approximately −9 dB regardless of the specific type of interaction, for example, acousto-optic or electro-optic. This filter response can substantially limit the minimum channel separation. In addition, the non-flat filter response in the main lobe causes the filter output to become extremely sensitive to deviations of the center wavelength from the design wavelength. These deviations occur due to unavoidable fluctuations in the device parameters or change in fabrication conditions.

Several techniques have been proposed to improve sidelobe suppression. D. Smith et al. (Electron. Lett. [1989] 25:398–399) propose cascading filters with uniform coupling. While permitting the suppression of sidelobes below approximately −19 dB, this approach produces severe sharpening of the main lobe, thus aggravating the problems associated with deviations in the center wavelength. Trutna et al. (Optics Letters [1993] 18:28–30) suggest employing nonuniform coupling in order to suppress sidelobes below −30 dB in an acousto-optic tunable filter. Bornholdt et al. (Appl. Phys. Lett. [1990] 57:2517–2518) proposed a meander type, in-plane directional coupler comprising curved waveguides. However, these designs are fundamentally limited with respect to the specific apodizing functions which can be implemented. Specifically, these designs can not realize alternating functions. The capability to realize alternating interaction, i.e., a predetermined spatial dependence of the coupling coefficient with negative sections where the coupling coefficient changes its phase by $\pi$, is of paramount importance to permit a synthesis of a step-like response with a flat top. Without such appropriately chosen negative sections, even though the sidelobes can be suppressed, the response top remains sharp. This has been demonstrated by A. Kar-Roy et al (IEEE Photonics Technology Letters [1992] 4:1132–1135) for the case of a filter with a focused acoustic wave, and by L. B. Aronson et al. (Optics Letters [1993] 18:1721–1723) for a structure with nonuniformly distributed birefringence.

J. Johnson et al. in U.S. Pat. No. 5,218,653 propose to taper the interaction-strength profile in an acousto-optical tunable filter with coupled waveguides for the surface acoustic wave. H. G. Song, (Applied Optics [1994] 33:7458–7460) presents a functional form of the spatial dependence required to obtain a step-like response with suppressed sidelobes and proposes the use of 180° reversals in a structure with coupled acousto-optic waveguides. Baran et al. in U.S. Pat. No. 5,446,807 disclosed an experimental acousto-optic filter with a flattened spectral response. However, these approaches have two substantial drawbacks. First, in the case of coupled acousto-optic waveguides, it is extremely difficult to incorporate the necessary functional profile of weighted (apodized) acousto-optic interaction. It requires waveguides with weighted coupling, for example, with a spatially varied inter-waveguide gap, and/or with an artificially induced and appropriately adjusted damping coefficient, for example, using a cover plate made of a semiconductor material. The fabrication of such a structure becomes complicated. Second, acousto-optic devices are known to require substantially higher drive power than electro-optic devices. Finally, the length of interaction must be several coupling lengths for the coupled acoustic waveguides. This results in interaction lengths of the order of several centimeters at conventional acoustic-wave frequencies and moderate drive powers. Accordingly, the minimum device length is of the same order of magnitude.

Methods of implementing alternating interaction-strength profiles, especially with electro-optic tuning, are sought to enhance the response of devices intended to filter/switch light in various optical systems, including WDM networks. In the present disclosure and in the appended claims, the term "light" encompasses optical radiation in both the visible and invisible spectral range, for example, infrared.

BRIEF SUMMARY OF THE INVENTION

The subject invention pertains to methods and apparatus for optical filtering. In a specific embodiment, a device according to the subject invention comprises two vertically-coupled waveguides, for example a single-mode waveguide and a two-mode waveguide. The waveguide parameters, such as dimensions and refractive indices, are selected so as to match, at the designed center wavelength, the propagation constants of the fundamental mode of the single-mode waveguide and the first-order anti-symmetric mode of the two-mode waveguide. At this wavelength, light is switched back and forth between the waveguides as it propagates along the structure. However, the waveguides fall off the synchronism and the power transfer drastically diminishes, as the wavelength is tuned away from the center wavelength. Accordingly, when light with several spectral components is coupled, for example, into the two-mode waveguide, only components within a finite wavelength range are transferred to the single-mode waveguide, while the remaining components continue propagating along the two-mode waveguide.

The center of at least one of the waveguides can change position along the direction of light propagation so that the longitudinal axis of at least one waveguide is curved. Accordingly, the coupling strength varies with the propagation distance and is apodized as necessary by properly selecting the curve describing the position of the waveguide center as a function of propagation distance. Advantageously, both the amplitude and the sign of the coupling coefficient can be controlled by offsetting the waveguides with respect to each other, due to the symmetric lateral distribution of the fundamental mode and the antisymmetric nature of the first-order antisymmetric mode field. Therefore, an arbitrary finite apodizing function (interaction-strength profile) and the corresponding spectral response can be implemented.

In a specific embodiment of the subject invention, particularly useful for monolithic optoelectronic components for wavelength division multiplexed (WDM) networks, a five-layer structure based on semiconductor layers of different composition such as, for instance, AlGaAs, InGaAsP or InGaAlAs can be implemented. The structure can be formed by using different fabrication processes, for example, molecular beam epitaxy, followed by, for example, wet chemical or dry (reactive ion) etching.

In another embodiment suitable for general-purpose, hybrid filter components, the method of the subject invention can be implemented in ferroelectric crystals (e.g., lithium niobate and lithium tantalate) or glass. This embodiment can be implemented, for example, with a two-layer structure on top of a dielectric substrate, for example, ferroelectric or glass, in which one of the coupled waveguides is formed, or on top of the substrate in which one of the coupled waveguides is formed. In a further embodiment, a three-layer structure on top of a dielectric substrate can be implemented.

In a specific embodiment of the subject invention, a structure composed of a coupled buried waveguide, formed in a dielectric substrate, and a channel ridge waveguide delineated on top of the substrate can be implemented.

In accordance with the subject invention, the excitation of the two-mode waveguide exclusively in its antisymmetric mode can, for example, be achieved by incorporating an asymmetric (nonidentical branches), adiabatic Y-branch junction with light being launched into the narrower converging waveguide. This permits the excitation of light in the antisymmetric mode in the Y-junction, which propagates along the Y-junction and is transmitted through the Y-junction's wider two-mode section, following the two-mode coupled waveguide.

BRIEF DESCRIPTION OF THE DRAWINGS

The invention, together with its various features and advantages, can be readily understood from the following more detailed description presented, for example, in InGaAlAs on InP, taken in conjunction with the accompanying drawings, in which.

DETAILED DISCLOSURE OF THE INVENTION

The subject invention pertains to methods and apparatus for optical filtering. In a specific embodiment, a device according to the subject invention comprises two vertically-coupled waveguides, for example a single-mode waveguide and a two-mode waveguide. The waveguide parameters, such as dimensions and refractive indices, are selected so as to match, at the designed center wavelength, the propagation constants of the fundamental mode of the single-mode waveguide and the antisymmetric mode of the two-mode waveguide. At this wavelength, light is switched back and forth between the waveguides as it propagates along the structure. However, the waveguides fall off the synchronism and the power transfer drastically diminishes as the wavelength is tuned away from the center wavelength.

Accordingly, when light with several spectral components is coupled, for example, into the two-mode waveguide, only components within a finite wavelength range that are phase matched are transferred to the single-mode waveguide, while the remaining components continue propagating along the two-mode waveguide.

The center of at least one of the waveguides can change position along the direction of light propagation so that the longitudinal axis of at least one waveguide is curved. Accordingly, the coupling strength varies with the propagation distance and is apodized as necessary by properly selecting the curve describing the position of the waveguide center as a function of propagation distance. Advantageously, both the amplitude and the sign of the coupling coefficient can be controlled by offsetting the waveguide with respect to each other, due to the symmetric lateral distribution of the fundamental mode and the antisymmetric nature of the antisymmetric mode field. Therefore, an arbitrary finite apodizing function (interaction-strength profile) and the corresponding spectral response can be implemented.

Although a preferred embodiment of the subject invention utilizes a single-mode waveguide and a two-mode waveguide with coupling between the fundamental mode of the single-mode waveguide and the anti-symmetric mode of the two-mode waveguide, combinations of multi-mode waveguides are also within the scope of the subject invention. In general the subject invention utilizes the coupling between an even, or symmetric, mode of one waveguide and an odd, or anti-symmetric, mode of another waveguide. In addition, embodiments of the subject invention can have asymmetries in the even mode of the first waveguide and/or the odd mode of the second waveguide and still produce apodized interaction with alternating sections according to the subject invention.

In accordance with the above principle of apodization, the subject invention pertains, in general, to waveguides with curved axes which are spatially closely-positioned with respect to one another to ensure optical coupling. For the purpose of discussion, we will identify these waveguides as spatially-coupled meander-type waveguides. The term 'meander-type' refers to the curved nature of the coupled waveguides. The term 'spatially-coupled' stems from such predecessors of the subject invention as an in-plane coupler (or vertically-coupled waveguides) wherein waveguide axes lie in one horizontal (or vertical) plane. In the subject invention, the coupled waveguides need not necessarily have their longitudinal axes lie in one plane. Rather, they may vary in the horizonal and/or vertical plane.

Figure 1:
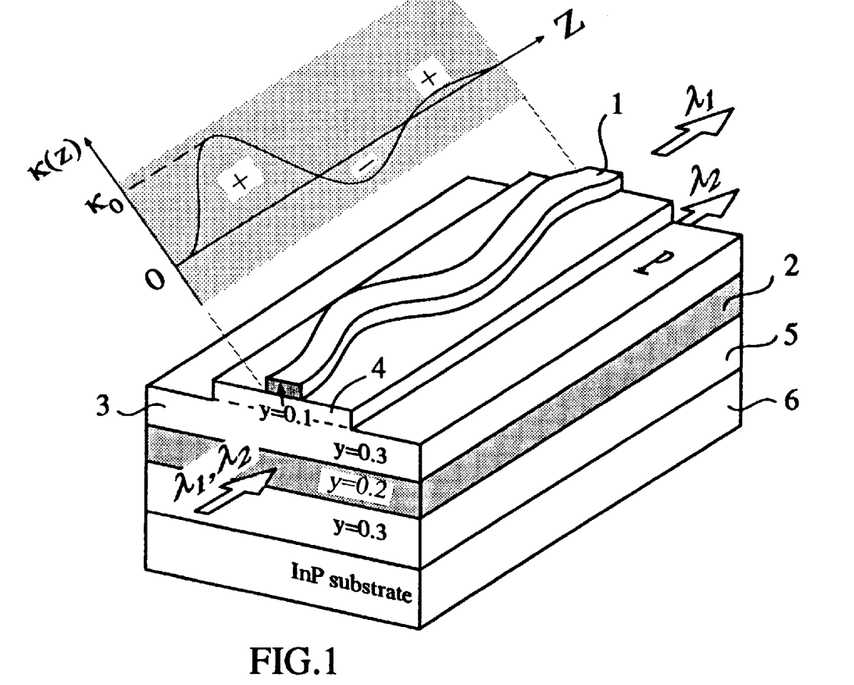
FIG. 1 shows a schematic view of a specific embodiment of the subject invention implemented in a vertically-stacked, coupled-waveguide, wavelength-selective filter structure comprising $In_{0.53}Ga_{0.47-y}Al_yAs$ layers of varying content y of Al grown on an InP substrate, with the interaction-strength profile, viz the coupling coefficient κ versus the propagation distance z, illustrated in the upper inset.

A specific embodiment according to the subject invention made of a semiconductor material is illustrated in FIG. 1. As a specific embodiment, the $In_{0.53}Ga_{0.47-y}Al_yAs$ material system can be considered. The structure comprises physically separate but optically coupled narrow upper (ridge) waveguide 1 and a wide bottom (strip-loaded) waveguide 2. To create the waveguiding effect, the layers of the ridge and strip-loaded waveguide have higher refractive indices than those of the cladding layers 3 and 5. The structure established by depositing layers with different composition (different Al content) during the structure growth on a bulk InP substrate 6. In $In_{0.53}Ga_{0.47-y}Al_yAs$ or $Al_yGa_{1-y}As$ material systems, increasing the Al content y decreases the refractive index while decreasing the Al content y increases the refractive index. Accordingly, the ridge and bottom waveguide have a lower Al content of y=0.1 and y=0.2, respectively, compared to y=0.3 of the cladding layers. Alternatively, layers of different materials, lattice matched to each other, can be used. The presence of the strip-loading 4 over the planar waveguide provides confinement along the horizontal direction for light propagating along the strip-loaded waveguide 2.

Due to the close proximity of one waveguide with respect to the other, there exists optical coupling between them. As a result, the waveguides may efficiently interchange optical energy provided they are phase matched, i.e., the propagation constants of their optical modes are equal at some wavelength. One of the most important parameters characterizing coupled-waveguide structures is the coupling length. In the case of identical coupled waveguides, it is the length over which light launched into one of the waveguides is completely switched to the other. Since the coupling strength is strongly dependent on the waveguide separation, the degree of transferred optical power can be altered, for the same device length, by modifying the inter-waveguide gap along the propagation direction. Contrary to the case of uniform coupling corresponding to constant-gap structures, a spatially modulated gap results in nonuniform interaction, called apodized (weighted) coupling. More generally, two or more states of a system can be coupled in the presence of a perturbation. In the case of coupled waveguides, it is the presence of a closely spaced waveguide that perturbs the propagation properties of the other. Another example is acousto-optic interaction, where two polarization states may be coupled via the perturbation caused by the acoustic wave.

The embodiment of the subject invention shown in FIG. 1 accomplishes apodized coupling with alternating sections by realizing a specified, spatially varying, overlap between the fundamental mode of one of the coupled waveguides and the first-order, anti-symmetric mode of the other. In a specific embodiment, either the upper or lower waveguide can be two-moded while the other, i.e., lower or upper, supports only the fundamental mode. For example, in FIG. 1 through FIG. 3, the case of a single-mode upper waveguide 1 with the lower waveguide 2 supporting two modes in the width direction is depicted.

Figure 2:
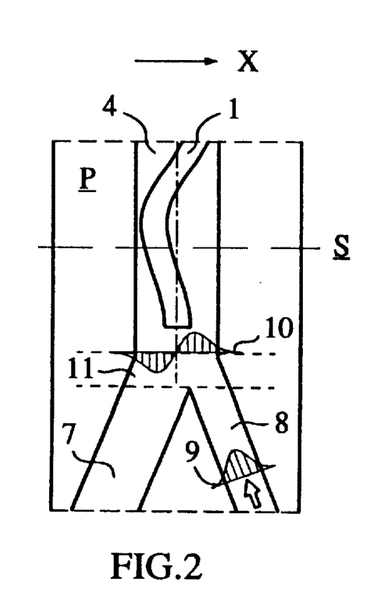
FIG. 2 shows the top view of the structure in FIG. 1 demonstrating the excitation of the antisymmetric mode by using an adiabatic Y-branch junction.

In a specific embodiment, efficient excitation of the two-mode waveguide predominantly in its first-order, anti-symmetric mode may be achieved by using, at the input of the wavelength-selective structure, an adiabatic Y-branch mode splitter with nonidentical branches 7 and 8 of, for example, different widths as illustrated in FIG. 2. A Y-branch is adiabatic if the interaction between its normal modes is weak enough to be neglected. For a Y-branch to be adiabatic, it is necessary that the structure be asymmetrical, for example, have nonidentical branches, and the transformation of the structure topology over the tapering section be gradual. Referring to FIG. 2, the Y-junction behaves as a mode splitter wherein light launched into the narrower arm 8 in the form of its fundamental mode 9 excites the anti-symmetric mode 10 of the two-mode output section 11 abutted to the strip loading 4. Excitation of the wider arm 7 would lead, on the other hand, to channeling optical power into the fundamental mode of the output section. It should be noted that the condition of gradually changing perturbation means that the branching angle should be small at least in the region where the waveguides are still optically coupled (close to the apex). For typical conditions of single-mode regime, it implies an angle of $\leq 1°$. In the interest of clarity, this angle is shown to be much larger in FIG. 2.

In order to illustrate the principle of operation of a filter according to the subject invention, the operation of the device illustrated in FIG. 1 will be described. Light with several spectral components, for example, a wavelength division multiplexed (WDM) signal, can be launched into the wavelength-selective structure shown in FIG. 1, through the narrow arm 8 of the Y-junction, as shown in FIG. 2, exciting the anti-symmetric mode 10 of the bottom waveguide 2. As the light propagates along the device, only those spectral components within a narrow wavelength range, i.e., the filter bandwidth, satisfying the phase matched condition determined by material and waveguide dispersion are switched over to the upper waveguide 1. The rest of light continues to propagate along the bottom waveguide 2 due to the wavelength-selective nature of the coupling process. Therefore, after traversing the wavelength-selective structure, the filtered-out spectral components propagate along the upper waveguide 1 while the main spectral stream is confined to the bottom waveguide 2. If this waveguide is then coupled to, for example, another ridge waveguide, phase-matched at a different center wavelength, other spectral components can be demultiplexed. Thus, a multichannel filter device can be implemented by cascading several wavelength-selective channel dropping structures tuned to different wavelengths.

Figure 3:
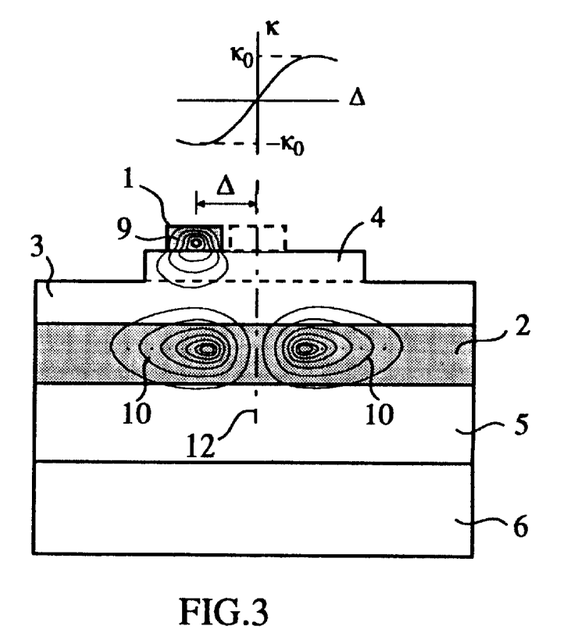
FIG. 3 depicts the cross-section $\underline{S}$ of the structure in FIG. 2 showing the offset of the upper waveguide with respect to the bottom that leads to a modulation of the coupling coefficient, wherein the coupling coefficient κ changes its sign when the center of the upper waveguide passes the vertical median Δ=0 of the bottom waveguide as shown in the upper inset.

The structure shown in FIG. 1, achieves apodization of the interaction strength by offsetting the upper waveguide 1 with respect to the lower waveguide 2. However, in general, the longitudinal axis of the strip-loading may also be curved. The coupling coefficient, $\kappa(z)$, which is, to a first approximation, the overlap integral of the modal field 10 of the bottom waveguide 2 and the modal field 9 of the ridge waveguide 1, changes its sign as the center of the upper waveguide 1 moves from right to left and back in the cross-section illustrated in FIG. 3. FIG. 3 shows the cross-section of the wavelength-selective structure in FIG. 1 at the vertical plane S marked in FIG. 2. Note that, regardless of specific waveguide parameters, the central position 12 ($\Delta=0$) of the upper waveguide 1, marked by the dashed-dotted line 12 in FIG. 3, corresponds to a zero coupling coefficient as shown in the upper inset of FIG. 3. This fact, as well as the realization of positive and negative $\kappa$, is due to the symmetric distribution, with respect to axis x, of the fundamental mode 9 and the anti-synmmetric distribution of the first-order mode 10. The peak value, $\kappa_0$, of interaction strength can be adjusted to an appropriate value by choosing a proper set of waveguide parameters. Specifically, the gap between the coupled waveguides is an important design parameter. The subject invention provides great flexibility in designing devices with apodized coupling. Indeed, since the coupling coefficient is an odd, monotonic function of the relative offset between the waveguides (see the inset of FIG. 3) many different finite coupling-strength profiles can easily be realized by properly offsetting the center of the upper, lower, or both waveguides along the propagation direction.

To deduce specific structure parameters, e.g., layer dimensions and compositions, which will result in a desired spectral response, the z-dependent variation of the coupling coefficient, $\kappa(z)$, should first be determined. For devices such as coupled-waveguide filters, we start from the desired filter response and need to reconstruct the corresponding coupling coefficient, $\kappa=\kappa(z)$.

The dependence $\kappa=\kappa(z)$ can be reconstructed, for instance, by using the technique demonstrated by G. H. Song et al. (*Journal of Optical Society of America A,* [1985] 2:1905–1915), which is similar to the techniques for solving the inverse scattering problem. In the case of weak coupling, the filter response and the interaction profile are known to be related to each other through the forward and inverse Fourier transform. Accordingly, in order to obtain, for example, a filter response with suppressed sidelobes, the onset and cutoff of the interaction must be gradually tapered. This can easily be achieved by gradually decreasing the lateral offset at the ends of the interaction length.

Figure 4A:
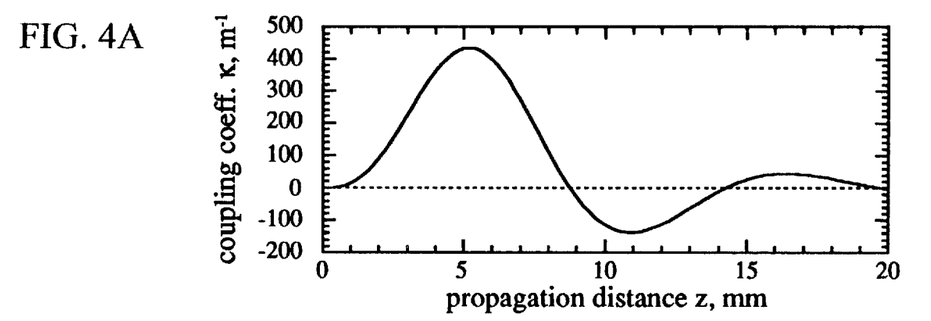
FIG. 4A illustrates the coupling coefficient versus propagation distance. The functional profile, for example, illustrated here is for a $4^{th}$-order Butterworth-type interaction.
Figure 4B:
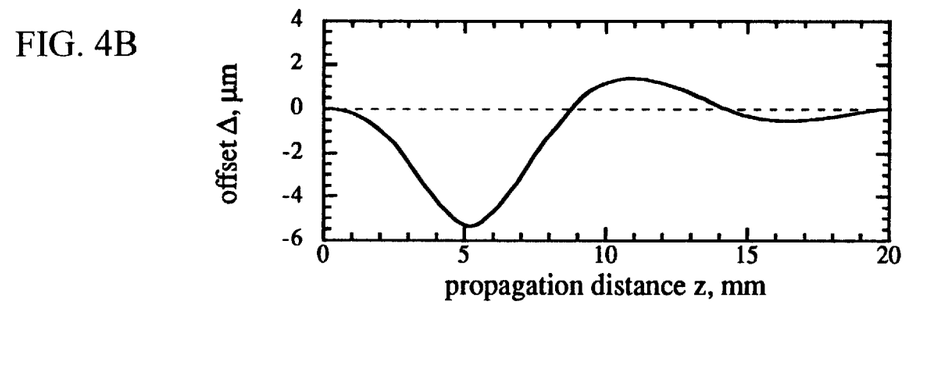
FIG. 4B shows the corresponding topology, i.e., offset vs. propagation distance, of the upper waveguide of FIG. 4A.

After the z-dependent variation of the coupling coefficient, $\kappa(z)$, is obtained, the topology of the upper waveguide, i.e., the spatial dependence $\Delta=\Delta(z)$, can then be determined by using the fact that $\kappa$ is a function of the lateral offset, $\Delta$, shown illustratively in the inset of FIG. 3. To illustrate by an example, the dependence $\Delta=\Delta(z)$ corresponding to the interaction profile shown in FIG. 4A and obtained through the associated dependence $\kappa$ on $\Delta$ is shown in FIG. 4B.

G. H. Song (*Applied Optics* [1994] 33:7458–7460) presents a functional form of the spatial dependence $\kappa=\kappa(z)$ approximating that required to obtain a step-like response with suppressed sidelobes, a Butterworth-type response. It is shown in FIG. 4A for the case of the 4th-order Butterworth filter. The main feature is the existence of intervals where $\kappa$ changes its sign, 180°-reversals. The necessity for phase reversals along with the gradual interaction profile had previously hindered realization of passband filters with a flattened top and suppressed sidelobes. Advantageously, the subject invention allows the implementation of this kind of interaction. Utilizing the subject invention, oscillating dependencies are as easy to implement as constant-sign profiles. The corresponding dependence $\Delta=\Delta(z)$, i.e., topology of the upper waveguides, required to realize a step-like passband filter response is shown in FIG. 4B. For clarity of presentation, the offset is shown much larger than it actually is. Due to the large disparity in the characteristic dimensions along the z- and x-axes, the maximum slope of the curve is preferably very small, for example, less than a degree for the structure in FIG. 4B, and, hence, does not cause excess loss which may otherwise be associated with bent waveguides.

Figure 5:
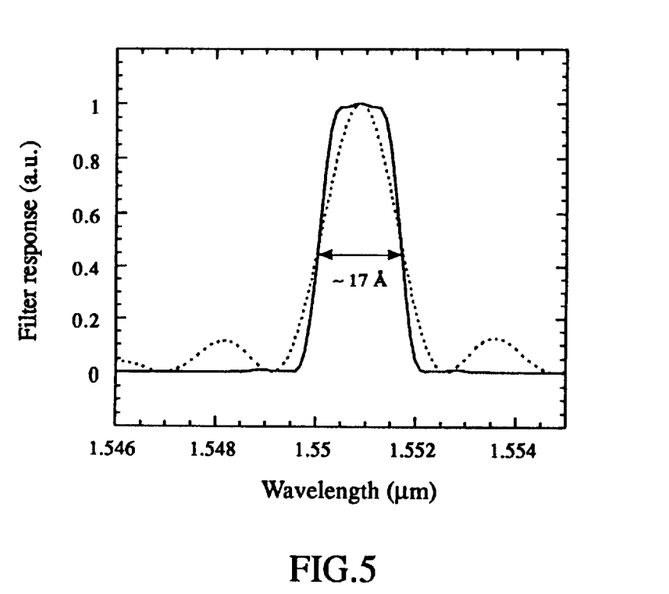
FIG. 5 represents the spectral response of the filter structure in FIG. 1 with the topology as shown in FIG. 4B (solid line) and the spectral response of a conventional, non-apodized vertically-stacked filter (dotted line).

FIG. 5 shows the filter response (solid line) corresponding to the embodiment shown in FIG. 1 with the interaction-strength profile as in FIG. 4A. It clearly demonstrates the bandpass response of the asymmetric vertical coupler with a center wavelength of approximately 1.5 mm and a full-width at half magnitude bandwidth of approximately 17 Å. The bandwidth may be further narrowed by increasing the interaction length (decreasing the interaction strength) and/or by incorporating a grating into the structure. This grating can, for example, be formed on top of the upper waveguide as suggested by H. Sakata et al., in U.S. Pat. No. 5,333,216 or in between the coupled waveguides as demonstrated by I. Kim (*Applied Physics Letters* [1994] 64:2764–2766). Referring to FIG. 5, the response exhibits strong sidelobe suppression of approximately 30 dB below the main lobe with a top flatness of ±1% over approximately 52% of the filter bandwidth, for a single-stage device (solid line). This compares to only about 17% for a filter with uniform coupling (dotted line). Further suppression of sidelobes can be achieved by cascading several filters where, for example, each of the concatenated structures is used to drop one spectral channel. Advantageously, this cascading is not accompanied by the substantial sharpening of the main lobe that multi-stage filters with uniform coupling suffer from. This is due to the step-like response of each filter-section. Tuning/switching of the center wavelength of the filter can be achieved, for example, via the electro-optic effect by applying an external voltage to the electrodes placed either on top and bottom or on both sides of the waveguides depending on the material and configuration. This effect has been demonstrated, in the case of uniform coupling, by I. Kim et al., (1994) *Applied Physics Letters,* 64:2764–2766 and H. Sakata et al., U.S. Pat. No. 5,131,060. Electro-optic modulation may be obtained via many different mechanisms, for example, Pockels effect and band-shifting. A distinct advantage of electro-optic modulation as compared to acousto-optic modulation, is that the former offers substantially reduced power consumption. In addition, the former offers higher stability due to the absence of instabilities associated with nonuniform heating associated with the dissipation of power of the acoustic wave. Another way of tuning the center wavelength is based on the thermo-optical effect which is applicable to an embodiment of the subject invention in, for example, glass. In this case, the electrodes are heated by driving an electric current through them.

Figure 6A:
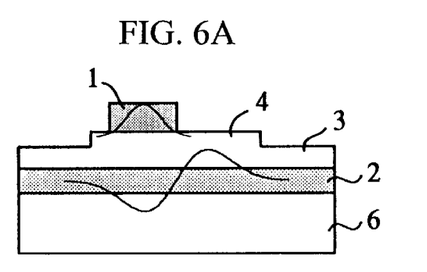
FIG. 6A shows a cross-section of a wavelength-selective structure, in accordance with the subject invention, comprising three dielectric layers on top of a dielectric substrate wherein the apodization of the coupling coefficient is created by spatially offsetting a single-mode upper waveguide and a two-mode lower waveguide.
Figure 6B:
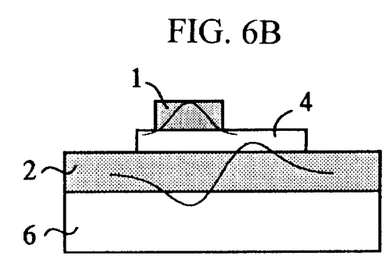
FIG. 6B shows a cross-section of a wavelength-selective structure, in accordance with the subject invention, comprising three dielectric layers on top of a dielectric substrate wherein the apodization of the coupling coefficient is created by spatially offsetting a single-mode upper waveguide and a two-mode lower waveguide.
Figure 6C:
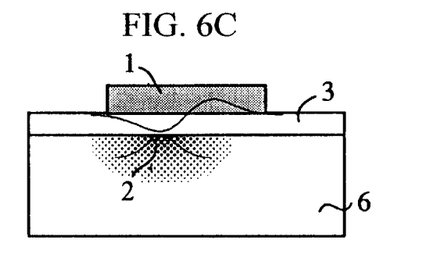
FIG. 6C shows a cross-section of a wavelength-selective structure, in accordance with the subject invention, comprising two dielectric layers on top of a dielectric substrate wherein the apodization of the coupling coefficient is created by spatially offsetting a two-mode upper waveguide and a single-mode lower waveguide.
Figure 6D:
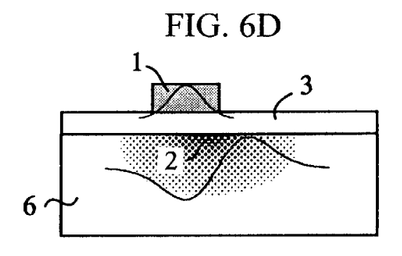
FIG. 6D shows a cross-section of a wavelength-selective structure, in accordance with the subject invention, comprising two dielectric layers on top of a dielectric substrate wherein the apodization of the coupling coefficientis created by spatially offsetting a single-mode upper waveguide and a two-mode lower waveguide.

Referring to FIGS. 6A–6D, four additional embodiments of the subject invention are shown, for example, embodied in semiconductors or dielectrics. In fact, devices according to the subject invention may be embodied in, for example, ferroelectric materials, glass materials, polymers, or a combination thereof. Referring to FIGS. 6A and 6B, two coupled waveguides may be formed by three layers placed on top of a substrate 6. Referring to FIGS. 6C and 6D, two couple waveguides may be formed by two layers placed on top of a substrate 6. Materials with a considerably different material dispersion can be used to narrow the filter bandwidth while keeping the device length fixed. The structures in FIGS. 6A–6D comprise two coupled waveguides 1 and 2, wherein a bottom waveguide 2 is formed either by depositing a strip-loading 4 or by employing standard fabrication methods, including but not limited to indiffusion, ion exchange, ion implantation, and proton exchange. In these embodiments, one of the waveguides is single-moded and the other two-moded. FIGS. 6C and 6D illustrate two embodiments. In FIGS. 6A–6D the cross-sections of the wavelength-selective are shown. One or both waveguides can be curved to produce the necessary interaction-strength profile. Tuning/switching of the center wavelength may be accomplished by the means previously described.

Figure 7A:
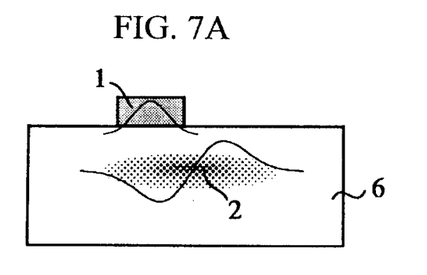
FIG. 7A shows a cross-section of a wavelength-selective structure, in accordance with the subject invention, comprising a dielectric single-mode ridge waveguide on top of a dielectric substrate with a buried channel two-mode waveguide of a diffused refractive-index profile, wherein the apodization of the coupling coefficient is produced by spatially offsetting the waveguides.
Figure 7B:
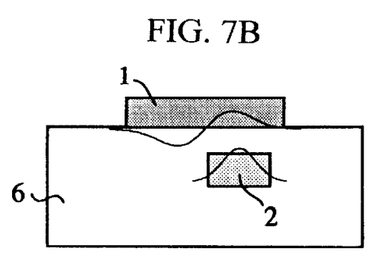
FIG. 7B shows a cross-section of a wavelength-selective structure, in accordance with the subject invention, comprising a dielectric two-mode ridge waveguide on top of a dielectric substrate with a buried channel single-mode waveguide of an abrupt refractive-index profile, wherein the apodization of the coupling coefficient is produced by spatially offsetting the waveguides.

An additional embodiment of the subject invention, which can be implemented in ferroelectric material, glass materials, or a combination, is depicted in FIGS. 7A and 7B. This embodiment comprises two coupled waveguides 1 and 2, wherein a bottom waveguide 2 is a buried waveguide with a diffused, shown in FIG. 7A, or abrupt, shown in FIG. 7B, refractive-index profile. The upper waveguide 1 can be a rib waveguide with no intermediate layer separating it from the substrate 6. All said regarding the embodiments in FIGS. 6A–6D also pertains to the embodiments shown in FIGS. 7A and 7B.

It is understood that the above described arrangements are merely illustrative and that many other possible specific embodiments can be devised to represent application of the principles of the invention. Numerous and varied other arrangements can be devised in accordance with these principles by those skilled in the art without departing from the spirit and scope of the invention.

What is claimed is:

1. A device, comprising:
   a first energy carrying structure
   a second energy carrying structure, wherein said second energy carrying structure is located relative to said first energy carrying structure such that a coupling coefficient associated with said first and second energy carrying structures alternates between positive and negative as a function of propagation distance.

2. A device, according to claim 1, wherein said first energy carrying structure is a first waveguide and said second energy carrying structure is a second waveguide.

3. The device according to claim 2, wherein said first and second waveguides are both curved along the propagation direction.

4. The device according to claim 3, wherein said first waveguide has at least two modes and said second waveguide has at least one mode.

5. The device according to claim 4, wherein said first waveguide is a two-mode waveguide and said second waveguide is a single-mode waveguide, wherein parameters for said first and second waveguides are selected so as to match, for a selected wavelength, the propagation constant of the fundamental mode of said second waveguide and the propagation constant of the anti-symmetric mode of said first waveguide, and wherein said coupling coefficient is associated with coupling between the fundamental mode of said second waveguide and the anti-symmetric mode of said first waveguide.

6. The device according to claim 5, wherein said first waveguide branches into a wider branch and a narrower branch such that said wider branch and said narrower branch form a Y-branch having single-mode input branches of different widths and a two-mode output section, and wherein light launched into said narrower branch is converted from the fundamental mode of said narrower branch into the anti-symmetric mode of said two-mode output section and is coupled to said first waveguide.

7. The device according to claim 5, wherein said first waveguide is a strip-loaded waveguide comprising a strip loading and said second waveguide is a ridge waveguide, wherein said strip loading branches into a wider branch and a narrower branch such that said wider branch and said narrower branch form an adiabatic Y-branch having single-mode input branches of different widths and a two-mode output section, and wherein light launched into said narrower branch is converted from the fundamental mode of said narrower branch into the anti-symmetric mode of said two-mode output section and is coupled to said first waveguide.

8. The device according to claim 5, wherein said first and second waveguides are vertically coupled, and wherein said device comprises at least two semiconductor layers on top of a semiconductor substrate such that said first waveguide is a lower waveguide and said second waveguide is an upper waveguide.

9. The device according to claim 5, wherein said first and second waveguides are vertically coupled, and wherein said device comprises at least two semiconductor layers on top of a semiconductor substrate such that said first waveguide is an upper waveguide and said second waveguide is a lower waveguide.

10. The device according to claim 5, wherein said first and second waveguides are vertically coupled, and wherein said second waveguide is a semiconductor ridge waveguide on top of a semiconductor substrate and said first waveguide is a buried waveguide with a diffused refractive-index profile.

11. The device according to claim 5, wherein said first and second waveguides are vertically coupled, and wherein said first waveguide is a semiconductor ridge waveguide on top of a semiconductor substrate and said second waveguide is a buried waveguide with an abrupt refractive-index profile.

12. The device according to claim 5, further comprising a grating located in a position where the fundamental mode of said second waveguide and the anti-symmetric mode of said first waveguide overlap such that said grating alters the coupling coefficient for light of a specific range of wavelengths, wherein said specific range of wavelengths is a function of the parameters of said grating.

13. The device according to claim 5, further comprising at least two electrodes located relative to said first and second waveguides such that the application of voltages to said electrodes alters the wavelength for which the propagation constant of the fundamental mode of said second waveguide and the propagation constant of the anti-symmetric mode of said first waveguide match.

14. The device according to claim 2, wherein said coupling coefficient is associated with a symmetric mode of said second waveguide and an anti-symmetric mode of said first waveguide.

15. The device according to claim 2, further comprising a Y-branch for launching light into said first waveguide.

16. The device according to claim 15, wherein said Y-branch is adiabatic.

17. The device according to claim 16, wherein said Y-branch comprises non-identical branches such that said Y-branch comprises a narrower or branch, a wider branch and a two-mode section.

18. The device according to claim 17, wherein when light is launched into the narrower or branch of said Y-branch such light exits in the anti-symmetric mode of the Y-branch two-mode section and couples into the anti-symmetric mode of said first waveguide.

19. The device according to claim 18, wherein parameters for said first and second waveguides are selected so as to match, for a selected wavelength, the propagation constant of the fundamental mode of said second waveguide and the propagation constant of the anti-symmetric mode of said first waveguide.

20. The device according to claim 19, further comprising at least one additional waveguide wherein said at least one additional waveguide is located relative to said first waveguide such that at least one additional coupling coefficient associated with said at least one additional waveguide and said first waveguide alternates between positive and negative as a function of propagation distance.

21. The device according to claim 20, wherein parameters for said at least one additional waveguide are selected so as to match, for a corresponding at least one additional wavelength, the propagation constant of the fundamental mode of said at least one additional waveguide and the propagation constant of the anti-symmetric mode of said first waveguide, wherein said at least one additional coupling coefficient is associated with coupling between the fundamental mode of said at least one additional waveguide and the anti-symmetric mode of said first waveguide.

22. The device according to claim 21, wherein said device is used as an optical filter such that when light comprising several wavelength components is launched into the narrower branch of said Y-branch, only those wavelength components within a narrow range, centered at said selected wavelength, are switched over to said second waveguide and only those wavelength components within a narrow range, centered at said at least one additional selected wavelength, are switched over to a corresponding said at least one additional waveguide.

23. The device according to claim 19, wherein said device is used as an optical filter such that when light comprising several wavelength components, including said selected wavelength, is launched into the narrower branch of said Y-branch, only those wavelength components within a narrow range, centered at said selected wavelength, are switched over to said second waveguide.

24. The device according to claim 2, wherein said first and second waveguides are vertically coupled and the relative location of said first and second waveguides varies in a horizontal direction which is perpendicular to the direction of propagation.

25. The device according to claim 2, wherein said first and second waveguides are horizontally coupled and wherein the relative location of said first and second waveguides varies in a vertical direction which is perpendicular to the direction of propagation.

26. The device according to claim 2, wherein one of said waveguides is substantially straight and the other said waveguide is curved, along the propagation direction.

27. A method of implementing apodized coupling with alternating sections, comprising the following steps:

forming a first energy carrying structure;

forming a second energy carrying structure located relative to said first energy carrying structure such that a coupling coefficient associated with said first and second energy carrying structures alternates between positive and negative as a function of propagation distance;

launching energy into at least one of said first and second energy carrying structures.

28. The method according to claim 27, wherein said first energy carrying structure is a first waveguide, said second energy carrying structure is a second waveguide, and said energy launched into at least one of said first and second waveguides is light energy.

29. The method according to claim 28, wherein said first waveguide is a two mode waveguide and said second waveguide is a single-mode waveguide, wherein parameters for said first and second waveguides are selected so as to match, for a selected wavelength, the propagation constant of the fundamental mode of said second waveguide and the propagation constant of the anti-symmetric mode of said first waveguide, and wherein said coupling coefficient is associated with coupling between the fundamental mode of said second waveguide and the anti-symmetric mode of said first waveguide.

30. The method according to claim 29, wherein the step of launching light into at least one of said first and second waveguides further comprises the following steps:

abutting an adiabatic Y-branch comprising a wider branch, a narrower branch, and a two-mode output section, to said first waveguide; and launching light into the fundamental mode of said narrower branch, wherein said light converts from the fundamental mode of said narrower branch into the anti-symmetric mode of said two-mode output section and couples to said first waveguide.

* * * * *